United States Patent
Nakano et al.

(10) Patent No.: US 11,569,004 B2
(45) Date of Patent: Jan. 31, 2023

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Haruka Nakano, Mie (JP); Motohiro Yokoi, Mie (JP); Kenta Ito, Mie (JP); Shigeki Ikeda, Mie (JP); Suguru Yasuda, Mie (JP); Tetsuya Nishimura, Mie (JP); Hiroki Hirai, Mie (JP); Housei Mizuno, Mie (JP); Koichiro Goto, Mie (JP); Junichi Shirakawa, Mie (JP); Yoshitaka Kami, Osaka (JP); Yasushi Nomura, Osaka (JP); Sofia Barillaro, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES LTD., Osaka (JP)

( * ) Notice: Subject to any disclaimer, the term of this patent is extended or adjusted under 35 U.S.C. 154(b) by 0 days.

(21) Appl. No.: 17/276,691

(22) PCT Filed: Sep. 17, 2019

(86) PCT No.: PCT/JP2019/036341
§ 371 (c)(1),
(2) Date: Mar. 16, 2021

(87) PCT Pub. No.: WO2020/059694
PCT Pub. Date: Mar. 26, 2020

(65) Prior Publication Data
US 2022/0028577 A1      Jan. 27, 2022

(30) Foreign Application Priority Data

Sep. 19, 2018  (JP) .............................. JP2018-175193

(51) Int. Cl.
H01B 7/08 (2006.01)
H01B 7/04 (2006.01)
B60R 16/02 (2006.01)

(52) U.S. Cl.
CPC .............. *H01B 7/0838* (2013.01); *H01B 7/04* (2013.01); *B60R 16/0207* (2013.01)

(58) Field of Classification Search
CPC ........... B60R 16/0215; B60R 16/0207; B60R 16/0222; B60R 16/02; B60R 16/0238;
(Continued)

(56) References Cited

U.S. PATENT DOCUMENTS 286,035 A * 10/1883 Mayall ................. H01B 7/0838
427/119
4,138,193 A * 2/1979 Olszewski ........... G02B 6/4403
174/117 F
(Continued)

FOREIGN PATENT DOCUMENTS

CA      2364457 C  *  5/2008  ............ B60J 5/0416
DE     19746526         4/1999
(Continued)

OTHER PUBLICATIONS

International Search Report issued in International Patent Application No. PCT/JP2019/036341, dated Dec. 3, 2019, along with an English translation thereof.
(Continued)

*Primary Examiner* — Krystal Robinson
(74) *Attorney, Agent, or Firm* — Greenblum & Bernstein, P.L.C.

(57) ABSTRACT

The wiring member includes a wiring body and a shape maintaining member. The wiring body includes a sheet-like
(Continued)

member and a wire-like transmission member fixed on the sheet-like member. The shape maintaining member is formed into a sheet-like shape having higher stiffness than the sheet-like member and covers at least one side of the wiring body along a front-back direction of the wiring body to maintain a shape of the wiring body.

12 Claims, 6 Drawing Sheets

(58) Field of Classification Search
CPC ............ B60R 13/0206; B60R 13/0237; B60R 13/0275; B60R 2013/0287; B60R 19/54; B60R 25/00; B60R 25/1001; B60R 25/1004; B60R 11/02; B60R 16/0232; B60R 16/0239; B60R 16/027
See application file for complete search history.

(56) References Cited

U.S. PATENT DOCUMENTS

| | | | | | |
|---|---|---|---|---|---|
| 4,190,319 | A | * | 2/1980 | Eggleston | G02B 6/4403 385/103 |
| 4,355,865 | A | * | 10/1982 | Conrad | G02B 6/4403 156/303.1 |
| 5,367,440 | A | * | 11/1994 | Gruszczynski | G02B 6/0008 385/901 |
| 9,299,479 | B2 | | 3/2016 | Gotou et al. | |
| 2001/0011603 | A1 | * | 8/2001 | Ueno | H01B 7/0823 174/117 FF |
| 2002/0020545 | A1 | * | 2/2002 | Suzuki | H01R 12/594 174/117 F |
| 2003/0235012 | A1 | * | 12/2003 | Nishizawa | H05K 1/028 360/264.2 |
| 2007/0240898 | A1 | * | 10/2007 | Reichert | H01B 7/0838 174/117 FF |
| 2014/0305697 | A1 | * | 10/2014 | Hudson | H01B 7/0045 174/72 A |
| 2015/0329069 | A1 | * | 11/2015 | Daugherty | B60R 16/0207 174/72 A |
| 2021/0309168 | A1 | * | 10/2021 | Kisu | B60R 16/0215 |

FOREIGN PATENT DOCUMENTS

| | | |
|---|---|---|
| JP | 09-030341 | 2/1997 |
| JP | 2000-030542 | 1/2000 |
| JP | 2004-74954 | 3/2004 |
| JP | 2012-22803 | 2/2012 |
| JP | 2012-161234 | 8/2012 |
| JP | 2015-126668 | 7/2015 |
| JP | 2016-210356 | 12/2016 |

OTHER PUBLICATIONS

International Preliminary Report on Patentability issued in International Patent Application No. PCT/JP2019/036341, dated Apr. 1, 2021, along with an English translation thereof.

Official Communication issued in Japan Patent Application No. 2020-504035, dated Feb. 25, 2020, along with an English translation thereof.

China Office Action issued in China Patent Application No. 201980060487.3, dated Dec. 27, 2021, together with English translation thereof.

* cited by examiner

WIRING MEMBER

TECHNICAL FIELD

The present disclosure relates to a wiring member.

BACKGROUND ART

Patent Document 1 discloses a technique of sandwiching a wire harness wired in a predetermined routing form by a single-sided adhesive sheet to externally mount the wire harness, thereby retaining the routing form.

PRIOR ART DOCUMENTS

Patent Documents

Patent Document 1: Japanese Patent Application Laid-Open No. 2012-161234

SUMMARY

Problem to be Solved by the Invention

However, in the technique described in Patent Document 1, the wire harness is sandwiched by the single-sided adhesive sheet. Therefore, the wire harness does not have stiffness, and an end side portion significantly hangs down when an intermediate side portion is raised, thus there is a possibility that assembling operability deteriorates.

Therefore, it is an object of the present disclosure to provide a technique capable of increasing assemblability of a wiring member.

Means to Solve the Problem

A wiring member according to the present disclosure is a wiring member including: a wiring body including a sheet-like member and a wire-like transmission member fixed on the sheet-like member; and a shape maintaining member formed into a sheet-like shape having higher stiffness than the sheet-like member and covering at least one side of the wiring body along a front-back direction of the wiring body to maintain a shape of the wiring body.

Effects of the Invention

According to the present disclosure, assemblability of the wiring member can be increased.

DESCRIPTION OF EMBODIMENT(S)

Description of Embodiment of Present Disclosure

Figure 1:
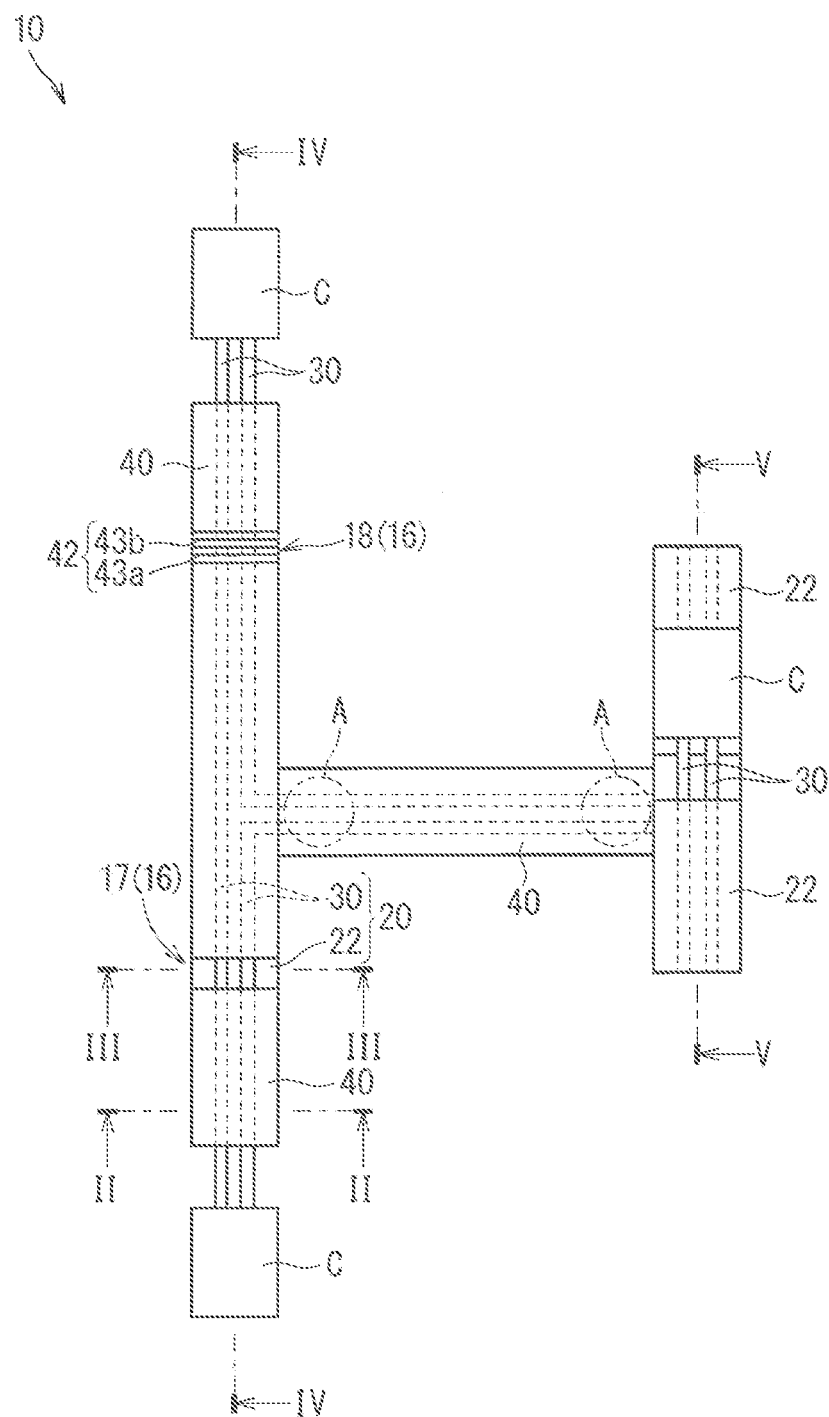
FIG. 1 is a plan view illustrating a wiring member according to a first embodiment.

Embodiments of the present disclosure are listed and described firstly.

A wiring member according to the present disclosure is as follows.

(1) A wiring member according to the present disclosure is a wiring member including: a wiring body including a sheet-like member and a wire-like transmission member fixed on the sheet-like member; and a shape maintaining member formed into a sheet-like shape having higher stiffness than the sheet-like member and covering at least one side of the wiring body along a front-back direction of the wiring body to maintain a shape of the wiring body. Accordingly, the shape maintaining member having the higher stiffness than the sheet-like member covers the wiring body, thus the wiring member hardly hangs down, and assemblability of the wiring member can be increased.

(2) The wiring member may include a one-side covering part where the shape maintaining member covers the wire-like transmission member only from a side opposite to the sheet-like member. Accordingly, the number of components can be reduced compared with a case where the shape maintaining member covers both sides of the wire-like transmission member.

(3) The shape maintaining member and the sheet-like member may be fixed by a contact area direct fixation on a lateral side of the wire-like transmission member in the one-side covering part. Accordingly, a fixing member remaining in the wiring member for fixing the shape maintaining member and the sheet-like member can be omitted.

(4) The wiring member may include a both-side covering part where the shape maintaining member covers both sides of the wiring body along a front-back direction of the wiring body. Accordingly, stiffness of the wiring member can be further increased by providing the both-side covering part. Alternatively, it is sufficient that necessary stiffness can be obtained by the shape maintaining members on the both sides, thus the shape maintaining members each having small stiffness can also be used.

(5) The shape maintaining member may be provided continuously along a longitudinal direction of the wiring body to be able to maintain a whole shape of the wiring body. Accordingly, the stiffness of the whole wiring member can be increased.

(6) The shape maintaining member may be provided so that the wiring member can be folded at an intermediate portion thereof. The wiring member is folded at the intermediate portion, thus a form at a time of transportation can be made compact.

(7) A wiring member according to the present disclosure is a wiring member including: a wiring body including a sheet-like member and a wire-like transmission member fixed on the sheet-like member, and a shape maintaining member formed into a sheet-like shape having higher stiffness than the sheet-like member and covering at least a part of a surface of at least one of a front surface and a rear surface of the wiring body to maintain a shape of the wiring body. Accordingly, the shape maintaining member having the higher stiffness than the sheet-like member covers the wiring body, thus the wiring member hardly hangs down, and assemblability of the wiring member can be increased.

(8) The sheet-like member may be made up of a plurality of base materials connected along a longitudinal direction of the wire-like transmission member. Accordingly, a yield of the sheet-like member can be increased.

(9) A suction pad can be applied to a position where the shape maintaining member is exposed when the wiring member is folded at the intermediate portion. Accordingly, the folded wiring member can be easily transported by a robot, for example.

(10) The sheet-like member and the shape maintaining member may be fixed to each other via an adhesive agent or resin. The above configuration is preferable in that a range of selecting a shape maintaining member having stiffness different from the sheet-like member is broadened.

(11) The sheet-like member and the shape maintaining member may be fixed to each other by a contact area direct fixation. The above configuration does not need an intervention of a different material between the sheet-like member and the shape maintaining member compared with the configuration that the sheet-like member and the shape maintaining member are fixed by a contact area indirect fixation. Thus, the above configuration is preferable from a viewpoint of cost reduction and reduction in a thickness of the wiring member itself.

(12) It is also applicable that the shape maintaining members are provided at intervals along a longitudinal direction of the wiring body, and the wiring member can be folded at a portion between the shape maintaining members provided at intervals. Accordingly, the wiring member can be folded with a simple configuration.

(13) It is also applicable that the shape maintaining member includes a wavelike processed part formed to have a peak and a trough continuously arranged in a longitudinal direction of the wiring body, and can be folded at a portion covered by the wavelike processed part. Accordingly, the shape maintaining member can cover the wiring body while the wiring member can be folded.

(14) It is also applicable that the shape maintaining member can be folded so that an outward main surface of the shape maintaining member provided on an intermediate side portion is exposed in a state where an end side portion is folded to be overlapped on the intermediate side portion. Accordingly, a suction pad can be applied to the portion of the shape maintaining member where the intermediate side portion is exposed. Accordingly, the folded wiring member can be easily transported by a robot, for example.

(15) It is also applicable that the shape maintaining member includes a planar molded part which is planarly molded and a three-dimensionally molded part standing from a part of the planar molded part along a width direction of the planar molded part in a front-back direction thereof and molded to extend in a longitudinal direction. Accordingly, stiffness of the shape maintaining member can be further increased by providing the three-dimensionally molded part.

(16) The plurality of the wire-like transmission members may be parallelly provided. Accordingly, the wiring member can be flatly formed.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

First Embodiment

Figure 2:
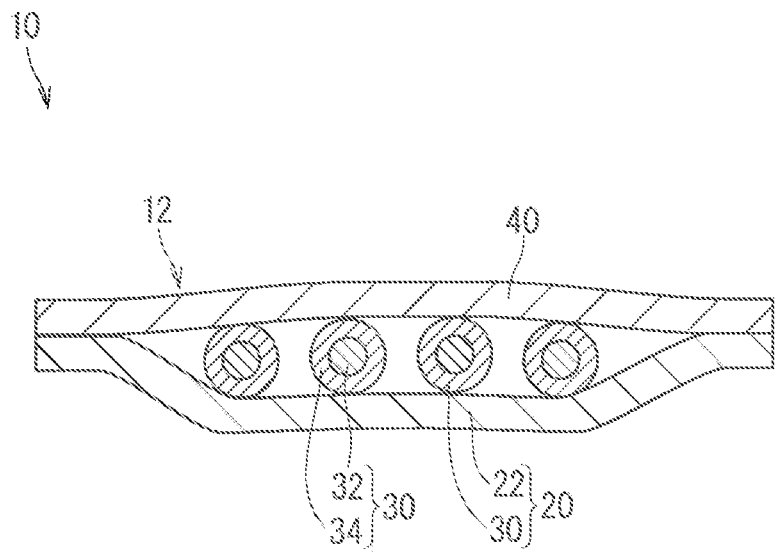
FIG. 2 is a cross-sectional view of the wiring member cut along a II-II line in FIG. 1.
Figure 3:
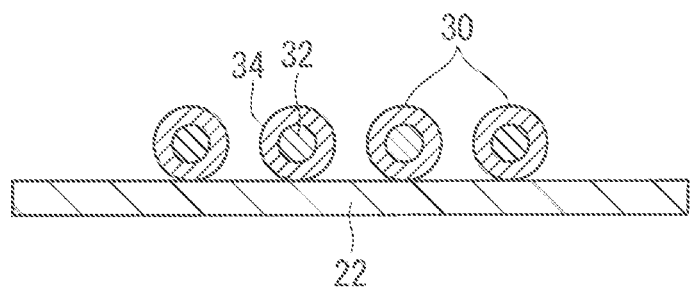
FIG. 3 is a cross-sectional view of the wiring member cut along a III-III line in FIG. 1.
Figure 4:
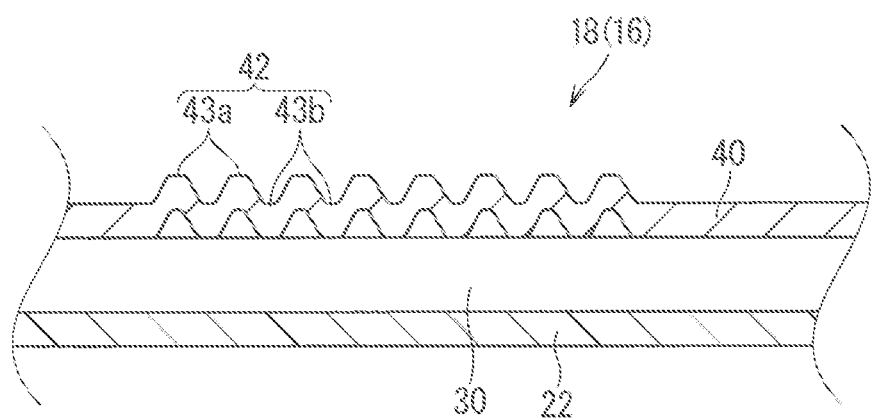
FIG. 4 is a partial cross-sectional view of the wiring member cut along a IV-IV line in FIG. 1.
Figure 5:
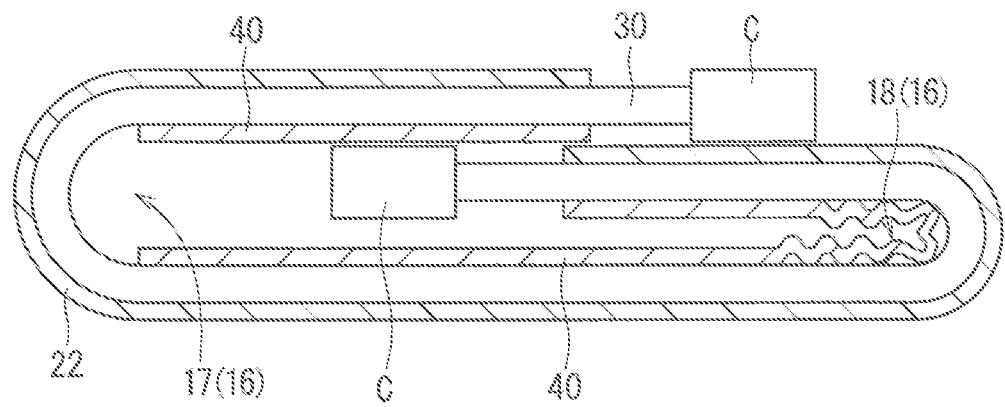
FIG. 5 is a schematic cross-sectional view of the wiring member cut along a V-V line in FIG. 1.

A wiring member according to a first embodiment is described hereinafter. FIG. 1 is a plan view illustrating a wiring member 10 according to the first embodiment. In FIG. 1, a terminal portion on a left side indicates a state before the wiring member 10 is folded, and a terminal portion on a right side indicates a state after the wiring member 10 is folded. When the terminal portion on the right side is developed, it will be the same as the terminal portion on the left side. FIG. 2 is a cross-sectional view of the wiring member 10 cut along a II-II line in FIG. 1. FIG. 3 is a cross-sectional view of the wiring member 10 cut along a III-III line in FIG. 1. FIG. 4 is a partial cross-sectional view of the wiring member 10 cut along a IV-IV line in FIG. 1. FIG. 5 is a schematic cross-sectional view of the wiring member 10 cut along a V-V line in FIG. 1.

The wiring member 10 is a member joined to a component mounted to a vehicle to transmit electrical power and/or light to and/or from the component. The wiring member 10 includes a wiring body 20 and a shape maintaining member 40 attached to the wiring body 20. In the wiring member 10, a shape of the wiring body 20 is maintained by the shape maintaining member 40. For example, it is sufficient that the shape of the wiring body 20 is maintained in a form to be disposed in a vehicle or a form similar thereto. Accordingly, a trouble of routing the wiring body 20 can be omitted at a time of assembling the wiring member 10 to the vehicle.

The wiring body 20 includes a sheet-like member 22 and a wire-like transmission member 30 fixed on the sheet-like member 22. Herein, the plurality of wire-like transmission members 30 are fixed to the sheet-like member 22. Accordingly, the plurality of wire-like transmission members 30 are positioned.

The sheet-like member 22 is used for fixing the wire-like transmission member 30. A material constituting the sheet-like member 22 is not particularly limited, but may contain resin such as polyvinyl chloride (PVC), polyethylene (PE), polyethylene terephthalate (PET), polypropylene (PP), and polyamide (PA), for example, or may contain metal such as aluminum or copper. A structure of the sheet-like member 22 is not particularly limited, however, a fiber material having fibers such as a woven cloth, a knitted cloth, and a non-woven cloth, for example, may be applicable, and a non-fiber material which does not have fibers such as a member made up by extrusion molding or injection molding may also be applicable. When the sheet-like member 22 is a non-fiber material made up by extrusion molding or injection molding, a foam made up by foam molding or a solid material which is not foam-molded but is uniformly solid may also be applicable. The sheet-like member 22 is preferably formed to have flexibility.

The sheet-like member 22 may have only a single layer or a plurality of layers. When the sheet-like member 22 has a plurality of layers, a material and a structure in each layer can be appropriately set. For example, the sheet-like member 22 may be made up of a resin layer and a resin layer overlapped with each other, a resin layer and a metal layer overlapped with each other, or a metal layer and a metal layer overlapped with each other. The sheet-like member 22 may be made up of a non-fiber material layer and a non-fiber material layer overlapped with each other, a non-fiber material layer and a fiber material layer overlapped with each other, or a fiber material layer and a fiber material layer overlapped with each other.

Herein, the sheet-like member 22 is formed into a shape corresponding to a route of the wire-like transmission member 30 (in the example illustrated in FIG. 1, an H shape in a planar view). Herein, the sheet-like member 22 may be made up of one sheet of base material or a plurality of base materials connected to each other. When the sheet-like member 22 is made up of a plurality of base materials connected to each other, it is sufficient that the base material has a shape with a high yield such as a quadrangular shape.

Herein, a width dimension of the sheet-like member 22 (a dimension of the sheet-like member 22 along a direction in which the wire-like transmission members 30 are parallelly arranged) is the same in each position, but may be different in accordance with the number and thicknesses of the wire-like transmission members 30. For example, when a dimension of the wire-like transmission members 30 along a parallel direction changes before or after a branch, the width dimension of the sheet-like member 22 on a side in which the dimension of the wire-like transmission members 30 along the parallel direction is large is considered to be larger than the width dimension of the sheet-like member 22 on a side in which the dimension of the wire-like transmission members 30 along the parallel direction is small.

It is sufficient that the wire-like transmission member 30 is a wire-like member transmitting electrical power or light. For example, the wire-like transmission member 30 may be a general wire having a core wire and a covering around the core wire, or may also be a bare conductive wire, a shielded wire, an enamel wire, a nichrome wire, or an optical fiber.

The wire-like transmission member 30 transmitting the electrical power may be various kinds of signal lines or various kinds of power lines. The wire-like transmission member 30 transmitting the electrical power may be used as an antenna or coil, for example, transmitting or receiving a signal or electrical power to or from a space.

The wire-like transmission member 30 is considered to include a transmission wire body 32 transmitting electrical power or light and a covering 34 covering the transmission wire body 32. When the wire-like transmission member 30 is a general wire, for example, the transmission wire body 32 corresponds to a core wire, and the covering 34 corresponds to an insulating covering. The core wire includes one or a plurality of strands. Each strand is formed of a conductive material such as copper, copper alloy, aluminum, and aluminum alloy, for example. When the core wire is made up of the plurality of strands, the plurality of strands are preferably stranded. The insulating covering is formed of a resin material such as PVC or PE extrusion-molded around the core wire.

In the example illustrated in FIG. 1, each end portion of the wire-like transmission member 30 is connected to a connector C. The connector C is connected to the other side connector provided in a component mounted to a vehicle and the other side connector provided on the end portion of the wire-like transmission member 30 extending from a component mounted to a vehicle. The end portion of the wire-like transmission member 30 may be connected to the other side of connection without an intervention of the connector C.

The number of wire-like transmission members 30 may be one, or the plurality of wire-like transmission members 30 may also be applicable, and can be appropriately set in accordance with the number of the circuits of the wiring member 10, for example. When the plurality of the wire-like transmission members 30 are provided, the wire-like transmission member 30 may be bundled or parallelly arranged on the sheet-like member 22. In the example illustrated in FIG. 1, the plurality of wire-like transmission members 30 are parallelly arranged on the sheet-like member 22.

When the plurality of wire-like transmission members 30 are provided, a diameter, a purpose of usage, and a shape of each wire-like transmission member 30 may be appropriately set.

In the example illustrated in FIG. 1, the plurality of wire-like transmission members 30 extend in parallel to each other on the sheet-like member 22, however, this configuration is not necessary. The plurality of wire-like transmission members 30 may intersect with each other, for example. In the example illustrated in FIG. 1, the wire-like transmission member 30 is bended and disposed on the sheet-like member 22. Particularly, in the example illustrated in FIG. 1, a branch is formed on the sheet-like member 22. The configuration that the branch is formed on the sheet-like member 22 and the wire-like transmission member 30 is bended and disposed on the sheet-like member 22 is not necessary, however, the route of the wire-like transmission member 30 on the sheet-like member 22 can be appropriately set.

In the example illustrated in FIG. 1, an intermediate portion of the wire-like transmission member 30 is fixed on the sheet-like member 22 and an end portion thereof extends to an outer side of the sheet-like member 22, however, this configuration is not necessary. The end portion of the wire-like transmission member 30 may also be located on the sheet-like member 22.

The wire-like transmission member 30 is fixed to the sheet-like member 22. A fixing form of the sheet-like member 22 and the wire-like transmission member 30 is described in detail hereinafter.

The shape maintaining member 40 is formed into a sheet-like shape having higher stiffness than the sheet-like member 22. A material constituting the shape maintaining member 40 and a structure thereof, for example, are not particularly limited as long as the shape maintaining member 40 has higher stiffness than the sheet-like member 22. With regard to the material, the material may include resin such as PVC, PE, PET, PP, or PA, for example, or may include metal such as aluminum or copper. With regard to the structure, a fiber material having fibers such as a contexture, a braided cloth, and a non-woven cloth, for example, may be applicable, and a non-fiber material which does not have fibers such as a member made up by extrusion molding or injection molding may also be applicable. When the shape maintaining member 40 is a non-fiber material made up by extrusion molding or injection molding, a foam made up by foam molding or a solid material which is not foam-molded but is uniformly solid may also be applicable. In the description herein, the shape maintaining member 40 is a non-fiber material including nylon or PP as a material.

The shape maintaining member 40 may have only a single layer or a plurality of layers. When the shape maintaining member 40 has a plurality of layers, a material and a structure in each layer can be appropriately set. For example, the shape maintaining member 40 may be made up of a resin layer and a resin layer overlapped with each other, a resin layer and a metal layer overlapped with each other, or a metal layer or a metal layer overlapped with each other. The shape maintaining member 40 may be made up of a non-fiber material layer and a non-fiber material layer overlapped with each other, a non-fiber material layer and a fiber material layer overlapped with each other, or a fiber material layer and a fiber material layer overlapped with each other.

The shape maintaining member 40 covers at least one side of the wiring body 20 along a front-back direction thereof to maintain a shape of the wiring body 20. Herein, the wiring member 10 includes a one-side covering part 12. The one-side covering part 12 is a part of the shape maintaining member 40 covering the wire-like transmission member 30 only from a side opposite to the sheet-like member 22. In the description of the example illustrated in FIG. 1, the wiring member 10 includes only the one-side covering part 12. Accordingly, herein, the shape maintaining member 40 covers only one side of the wiring body 20 along the front-back direction thereof.

The shape maintaining member 40 may have a configuration of covering a whole region of the sheet-like member 22 along the route of the wire-like transmission member 30 or covering only a part thereof. Herein, the shape maintaining member 40 covers a large part of the whole region of the sheet-like member 22 along the route of the wire-like transmission member 30 except for a part of the region. At this time, the region where the shape maintaining member 40 does not cover the sheet-like member 22 along the route of the wire-like transmission member 30 may be an end portion or an intermediate portion of the sheet-like member 22. In the example illustrated in FIG. 1, there is the region where the shape maintaining member 40 does not cover the sheet-like member 22 in the intermediate portion of the sheet-like member 22 along the route of the wire-like transmission member 30. This region is a region used for folding the wiring member.

The portion where the shape maintaining member 40 continuously covers the sheet-like member 22 may be made up of one sheet of base material or a plurality of base materials connected to each other. When the shape maintaining member 40 is made up of a plurality of base materials connected to each other, it is sufficient that the base material has a shape with a high yield such as a quadrangular shape.

Herein, a width dimension of the shape maintaining member 40 (a dimension of the shape maintaining member 40 along a direction in which the wire-like transmission members 30 are parallelly arranged) is the same in each position, but may be different in accordance with the number and thicknesses of the wire-like transmission members 22 and the width dimension of the sheet-like member 22. For example, when the dimension along the parallel direction of the wire-like transmission member 30 changes before or after a branch, the width dimension of the shape maintaining member 40 on a side in which the dimension along the parallel direction of the wire-like transmission member 30 is large is considered to be larger than the width dimension of the shape maintaining member 40 on a side in which the dimension along the parallel direction of the wire-like transmission member 30 is small. For example, when there is a portion where the width dimension of the sheet-like member 22 is different, the width dimension of the shape maintaining member 40 is also considered different in accordance with the width dimension of the sheet-like member 22.

The shape maintaining member 40 is fixed to the sheet-like member 22. Herein, in the one-side covering part 12, the shape maintaining member 40 and the sheet-like member 22 are fixed to each other on a lateral side of the wire-like transmission member 30.

Accordingly, in the wiring member 10, each of the wire-like transmission member 30 and the shape maintaining member 40 is fixed to the sheet-like member 22. The wire-like transmission member 30 and the shape maintaining member 40 are collectively referred to as the fixing target members 30 and 40 in some cases hereinafter. At this time, each fixing state of fixing the fixing target members 30 and 40 to the sheet-like member 22 is not particularly limited. Applicable as the above fixing state are a contact area fixation and a non-contact area fixation, or both fixations may be used together. Herein, the contact area fixation indicates that a portion where the sheet-like member 22 and the fixing target members 30 and 40 have contact with each other is stuck and fixed. The non-contact area fixation indicates the fixing state which is not the contact area fixation. For example, a sewing thread, the other sheet-like member 22, or an adhesive tape presses the fixing target members 30 and 40 toward the sheet-like member 22, or a sewing thread, the other sheet-like member 22, or an adhesive tape surrounds the fixing target members 30 and 40 and the sheet-like member 22, thereby sandwiching the fixing target members 30 and 40 and the sheet-like member 22 to keep the fixing target members 30 and 40 and the sheet-like member 22 fixed to each other. In the description hereinafter, the fixing target members 30 and 40 and the sheet-like member 22 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the fixing target members 30 and 40 and the sheet-like member 22 are indirectly stuck and fixed via an intervening member such as an adhesive agent, a gluing agent, a double-sided adhesive tape, and a hook and loop fastener provided therebetween. The contact area direct fixation indicates that the fixing target members 30 and 40 and the sheet-like member 22 are directly stuck and fixed without an intervention of the adhesive agent, for example, which is separately provided. Considered in the contact area direct fixation is that resin included in at least one of the fixing target members 30 and 40 and the sheet-like member 22 is melted, thus the fixing target members 30 and 40 and the sheet-like member 22 are stuck and fixed, for example. In the description hereinafter, the fixing target members 30 and 40 and the sheet-like member 22 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the fixing target members 30 and 40 and the sheet-like member 22 are in the state of the contact area direct fixation by these means. Specifically, when the state of the contact area direct fixation is formed by the ultrasonic welding, for example, the fixing target members 30 and 40 and the sheet-like member 22 are in the state of the contact area direct fixation by the ultrasonic welding. A portion where the state of the contact area direct fixation by the heat is formed by the welding (a fixing portion between the fixing target members 30 and 40 and the sheet-like member 22) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the fixing target members 30 and 40 may be melted, or only the resin included in the sheet-like member 22 may be melted. In these cases, the resin which has been melted is stuck on an outer surface of the resin on the other side, and a relatively clear interface may be formed in some cases. In the case of the contact area direct fixation, both the resin included in the fixing target members 30 and 40 and the resin included in the sheet-like member 22 may be melted. In this case, there may be a case where both the resins are mixed and a clear interface is not formed. Particularly, when the fixing target members 30 and 40 and the sheet-like member 22 include compatible resin such as the same resin material, for example, there may be a case where both the resins are mixed and a clear interface is not formed.

For example, when the sheet-like member 22 and the fixing target members 30 and 40 are fixed by ultrasonic welding, it is considered that the sheet-like member 22 and the fixing target members 30 and 40 are sandwiched between a horn and an anvil of an ultrasonic welding machine, and ultrasonic vibration is provided by the horn. A material of at least one of the sheet-like member 22 and the fixing target members 30 and 40 is melted by frictional heat generated in an interface between the sheet-like member 22 and the fixing target members 30 and 40, thus the sheet-like member 22 and the fixing target members 30 and 40 are fixed to each other.

The fixing target members 30 and 40 fixed to the sheet-like member 22 by the contact area direct fixation preferably includes the same material as the sheet-like member 22. Particularly, a resin composition as a material of the fixing target members 30 and 40 and a resin composition as a material of the sheet-like member 22 preferably have the same resin as a main component.

When the wire-like transmission member 30 and the shape maintaining member 40 are fixed to the sheet-like member 22 by the contact area direct fixation, the portion of the sheet-like member 22 fixed to the wire-like transmission member 30 by the contact area direct fixation and the portion fixed to the shape maintaining member 40 by the contact area direct fixation may be made up of different materials and have different structure, or may also be made up of the same material and have the same structure, for example. When the covering 34 of the wire-like transmission member 30 and the shape maintaining member 40 are formed of different types of resin as a main component, it is sufficient that the portion of the sheet-like member 22 fixed to the wire-like transmission member 30 by the contact area direct fixation is made of a material more compatible with the wire-like transmission member 30 than the shape maintaining member 40, and the portion fixed to the shape maintaining member 40 by the contact area direct fixation is made of a material more compatible with the shape maintaining member 40 than the wire-like transmission member 30.

The fixing state of fixing the sheet-like member 22 to the wire-like transmission member 30 and the shape maintaining member 40 may be the same or different from each other. At this time, any of the fixing states described above may be combined as the combination of the different types of fixing state.

The shape maintaining member 40 is provided so that the wiring member 10 can be folded at an intermediate portion thereof. An easy-folding part 16 enabling the folding is formed in the wiring member 10. The easy-folding part 16 is a part where the wiring member 10 can be folded at a position of the easy-folding part 16 more easily than a position where the shape maintaining member 40 is provided except for the position of the easy-folding part 16. Herein, a first easy-folding part 17 and a second easy-folding part 18 are formed as the easy-folding part 16.

The first easy-folding part 17 is a part where the shape maintaining members 40 are provided at intervals along a longitudinal direction of the wiring body 20 as described above. The wiring member 10 can be folded between the shape maintaining members 40 provided at intervals.

The second easy-folding part 18 is a part where a wavelike processed part 42 is formed in the shape maintaining member 40. The wavelike processed part 42 is formed to have a peak 43*a* and a trough 43*b* continuously arranged in the longitudinal direction of the wiring body 20. The peak 43*a* and the trough 43*b* are formed to extend in a width direction of the wiring body 20. The wiring member 10 can be folded at a portion covered by the wavelike processed part 42. A member molded to have a shape with the wavelike processed part 42 by injection molding, for example, can be used as the shape maintaining member 40 having the wavelike processed part 42. A member made by press-molding a planar plate to have a shape with the wavelike processed part 42 can also be used.

A configuration that both the first easy-folding part 17 and the second easy-folding part 18 are formed as the easy-folding part 16 is not necessary, however, only the first easy-folding part 17 or the second easy-folding part 18 may also be formed as the easy-folding part 16.

A position where the easy-folding part 16 is formed is not particularly limited, but can be set in accordance with a folding shape and a shape of being assembled to a vehicle, for example. The easy-folding part 16 is preferably formed in a portion bent in a front-back direction when the wiring member is assembled to a vehicle. Accordingly, the wiring member can be easily bent in the front-back direction at the time of being assembled to the vehicle using the easy-folding part.

The wiring member 10 is folded so that an end side portion is folded to be overlapped on an intermediate side portion using the easy-folding part 16. At this time, the wiring member 10 can be folded so that an outward main surface of the shape maintaining member 40 provided on the intermediate side portion is exposed in a state where the end side portion is folded to be overlapped on the intermediate side portion. That is to say, the wiring member 10 can be folded so that the end side portion is overlapped with only a part of the intermediate side portion. Accordingly, a suction pad (a vacuum pad) can be applied to the exposed intermediate side portion of the shape maintaining member 40. It is also considered that the intermediate side portion located on a lowest side in the state where the wiring member 10 is folded is a base portion and a portion overlapped therewith is a branch portion.

Each end side portion is folded only once in the example illustrated in FIG. 1. Accordingly, a portion ranging from the intermediate side portion to the end side portion is folded into a U shape. The end side portion may be folded several times. When the end side portion is folded several times, it may be spirally folded so that a portion closest to the end side is located inside, or may be accordion-folded so that the portion closest to the end side is located outside.

When the suction pad is applied to the shape maintaining member 40, the portion thereof is preferably formed to be airtight. From this viewpoint, the shape maintaining member 40 is preferably made up of a solid material or a closed foam material <Motion>

Figure 6:
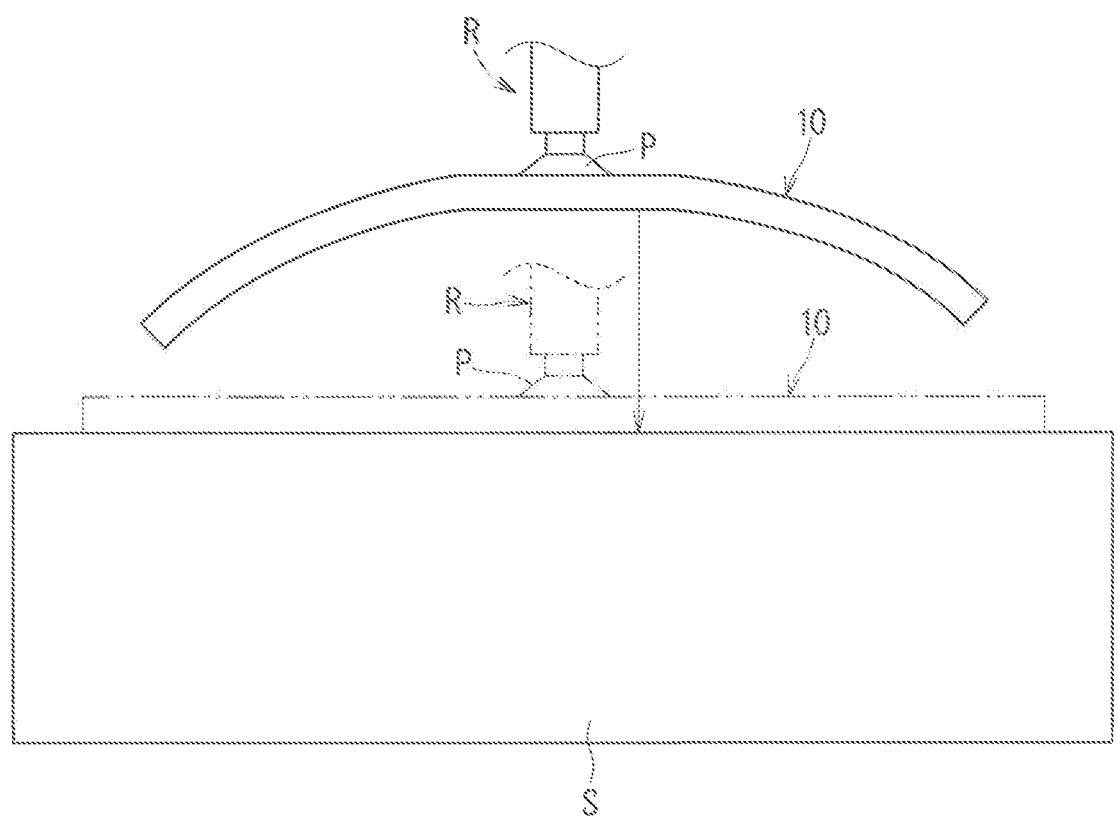
FIG. 6 is an explanation diagram illustrating a transported wiring member.

FIG. 6 is an explanation diagram illustrating a transported wiring member 10.

The shape maintaining member 40 has the sheet-like shape, thus a suction pad P is applied to the outward main surface thereof to be able to retain the shape maintaining member 40. Accordingly, the wiring member 10 can be raised by a robot R including the suction pad P, for example, and carried. A portion to which the suction pad P is applied is a region A illustrated by a dashed-two dotted line in FIG. 1, for example.

When a predetermined portion of the wiring member 10 is raised, more specifically, when the wiring member 10 is raised in a form that a portion where the shape maintaining member 40 located closer to the end side than the portion to which the suction pad P is applied extends to have a cantilever shape, the cantilever portion does not hang down due to stiffness of the shape maintaining member 40 or hangs down in an arched form even if it does. This configuration of hanging down in the arched form is a configuration of hanging down so that the hanging portion is bent inward on a table S which is larger in area than the wiring member 10 and the other portion is not overlapped on it when the wiring member 10 whose predetermined portion is raised and hangs down is located on the table S, that is to say, a configuration that the hanging portion extends outward on the table S. Accordingly, there is no need to correct the overlapping of the end portion after the wiring member 10 is carried by the robot R having the suction pad P, thus assembling operability can be increased.

In the example illustrated in FIG. 1, the suction pads P are applied to two positions on the wiring member 10, however, the position to which the suction pad P is applied is not limited thereto. The suction pad P may be applied to one position or three or more positions. However, it is preferable that the wiring member 10 can be raised without hanging down significantly with as less positions as possible. For example, it is considered that the suction pads P are applied to positions whose number is smaller than the number of the terminal portions and the wiring member 10 is raised without hanging down significantly.

Figure 7:
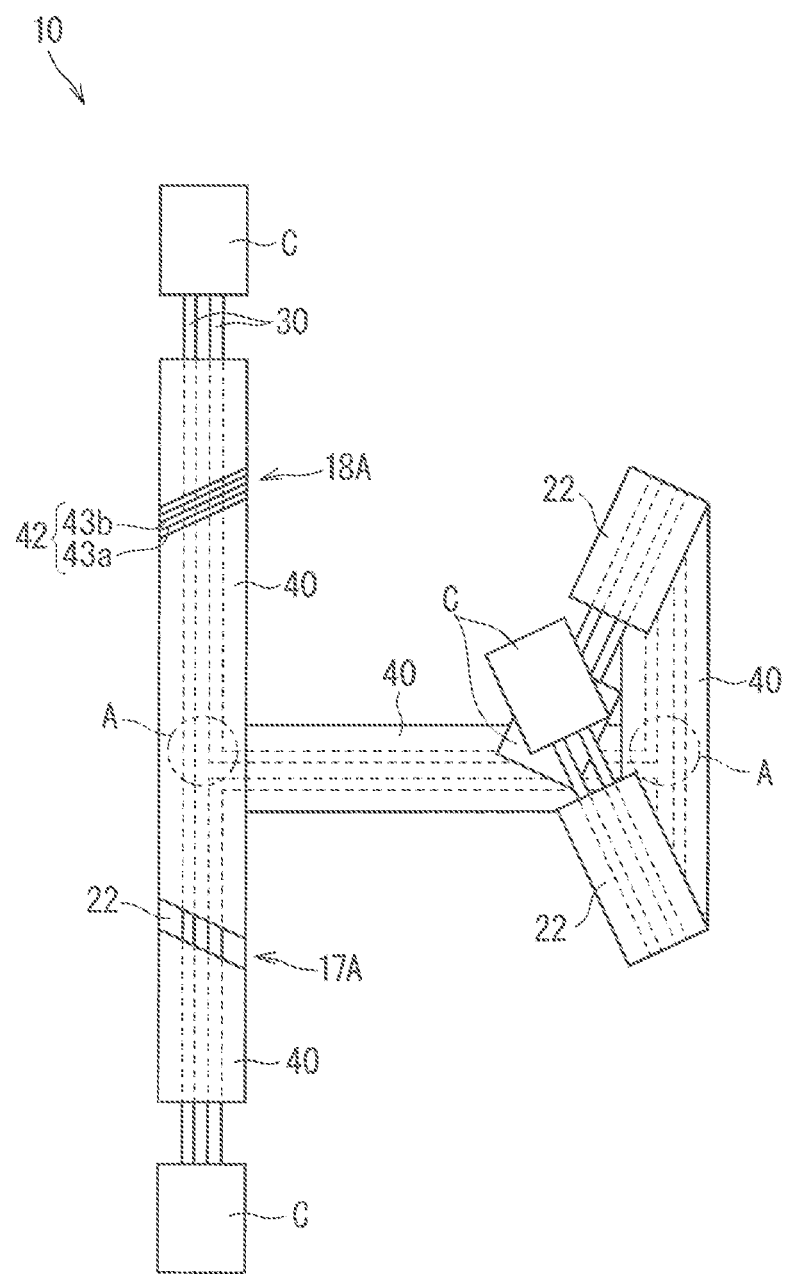
FIG. 7 is a plan view illustrating a modification example of a way to fold the wiring member.

FIG. 7 is a plan view illustrating modification example of a way to fold the wiring member 10. In FIG. 7, a terminal portion on a left side indicates a state before the wiring member 10 is folded, and a terminal portion on a right side indicates a state after the wiring member 10 is folded. When the terminal portion on the right side is developed, it will be the same as the terminal portion on the left side.

In the above description, the end side portion is folded along a line perpendicular to the longitudinal direction of the wire-like transmission member 30, however, this configuration is not necessary. As with the example illustrated in FIG. 7, the end side portion may be folded along a line intersecting with the longitudinal direction of the wire-like transmission member 30 at an angle other than the right angle. Accordingly, the portion of the shape maintaining member 40 where the outward main surface is exposed can be changed, and a desired position can be exposed easily. At this time, the portion to which the suction pad P is applied is a region A illustrated by a dashed-two dotted line in FIG. 7, for example.

For example, as illustrated in FIG. 7, end edge portions of the shape maintaining members 40 facing each other at intervals extend diagonally to the wire-like transmission member 30, thus the end side portion can be folded along the line intersecting with the longitudinal direction of the wire-like transmission member 30 at the angle other than the right angle. For example, as illustrated in FIG. 7, the peak 43a and the trough 43b of the wavelike processed part 42 are formed to extend diagonally to the wire-like transmission member 30 in a second easy-folding part 18A, thus the end side portion can be folded along the line intersecting with the longitudinal direction of the wire-like transmission member 30 at the angle other than the right angle. Alternatively, the interval between the shape maintaining members 40 is large enough to fold the end side portion along a line intersecting with the longitudinal direction of the wire-like transmission member 30 at an angle other than the right angle.

According to the wiring member 10 having the above configuration, the shape maintaining member 40 having higher stiffness than the sheet-like member 22 covers the wiring body 20, thus the wiring member 10 hardly hangs down. Particularly suppressed is that the end side portion of the wiring member 10 significantly hangs down when the intermediate portion of the wiring member 10 is raised. Accordingly, assemblability of the wiring member 10 can be increased.

The shape maintaining member 40 includes the one-side covering part 12 covering the wire-like transmission member 30 only from the side opposite to the sheet-like member 22, thus the number of the components can be reduced compared with a case where the shape maintaining member 40 covers the both sides.

The shape maintaining member 40 and the sheet-like member 22 are fixed to each other by the contact area direct fixation on the lateral side of the wire-like transmission member 30 in the one-side covering part 12, thus a fixing member remaining in the wiring member 10 for fixing the shape maintaining member 40 to the sheet-like member 22 can be omitted.

The shape maintaining member 40 is provided so that the wiring member 10 can be folded at the intermediate portion thereof. The wiring member 10 is folded at the intermediate portion, thus the form at the time of transportation can be made compact. The wiring member 10 is considered a large wiring member 10 which is bulky in an original shape, so that cost of transportation from a manufacturing plant to an assembly plant is high, for example.

The shape maintaining members 40 are provided at intervals along the longitudinal direction of the wiring body 20, and the wiring member 10 can be folded between the shape maintaining members 40 provided at intervals, thus the wiring member 10 can be folded with the simple configuration.

The shape maintaining member 40 includes the wavelike processed part 42 formed to have the peak 43a and the trough 43b continuously arranged in the longitudinal direction of the wiring body 20, and the wiring member 10 can be folded at the portion covered by the wavelike processed part 42, thus the shape maintaining member 40 can cover the wiring body 20 in the state where the wiring member 10 can be folded.

The wiring member 10 can be folded so that the outward main surface of the shape maintaining member 40 provided on the intermediate side portion is exposed in the state where the end side portion is folded to be overlapped on the intermediate side portion, thus the suction pad P can be applied to the intermediate side portion of the exposed shape maintaining member 40. Accordingly, the folded wiring member 10 can be easily transported by the robot R, for example.

The plurality of wire-like transmission members 30 are parallelly provided, thus the wiring member 10 can be flatly formed. Accordingly, the wiring member 10 can be two-dimensionally handled. A plane surface for applying the suction pad P to the shape maintaining member 40 can be easily ensured. An area of contact of the wiring member with the other side member can be increased when the wiring member is assembled, and the wiring member can be simply fixed with an adhesive agent or an adhesive tape, for example.

Second Embodiment

Figure 8:
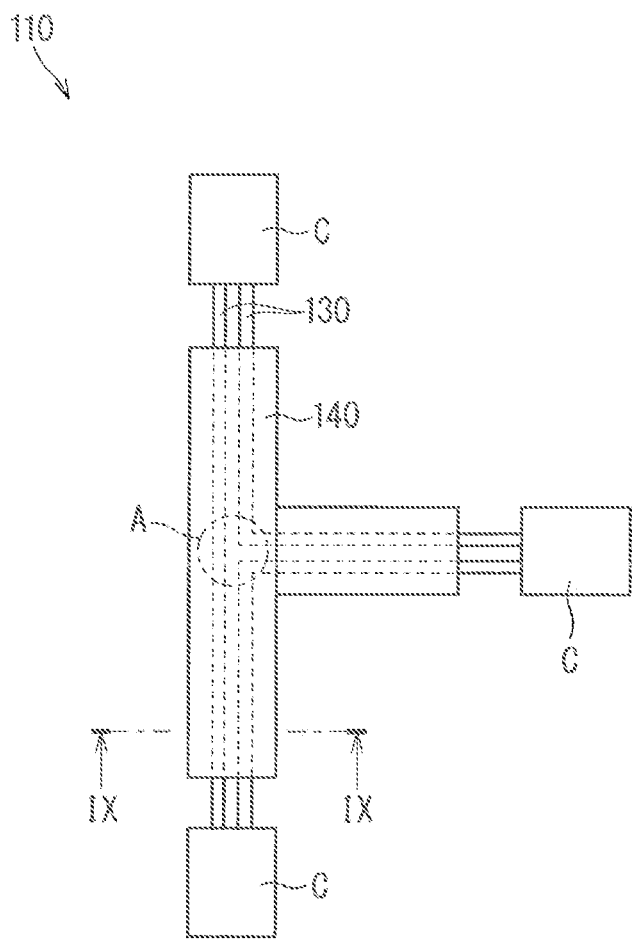
FIG. 8 is a plan view illustrating a wiring member according to a second embodiment.
Figure 9:
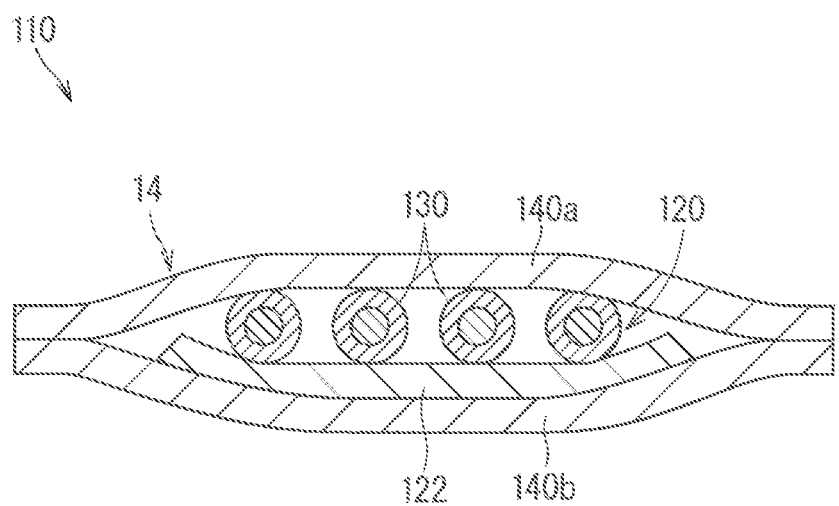
FIG. 9 is a partial cross-sectional view of the wiring member cut along an IX-IX line in FIG. 8.

A wiring member according to a second embodiment is described. FIG. 8 is a plan view illustrating a wiring member 110 according to the second embodiment. FIG. 9 is a partial cross-sectional view of the wiring member 110 cut along a IX-IX line in FIG. 8. In the description of the present embodiment, the same reference numerals are assigned to the similar constituent elements described above, and the description thereof will be omitted.

The wiring member 110 according to the second embodiment is different from the wiring member 10 according to the first embodiment in that a shape maintaining members 140 are continuously provided along a longitudinal direction of a wiring body 120 so as to be able to maintain a whole shape of the wiring body 120.

More specifically, the shape maintaining members 140 are wholly connected, and the first easy-folding part 17 is not provided in the wiring member 110. The wavelike processed part which is to be the second easy-folding part 18 is not formed in the shape maintaining member 140. According to the above configurations, there is no the easy-folding part 16 in the wiring member 110, and the shape maintaining member 140 can maintain the whole shape of the wiring body 120.

There may be a case where the terminal portion is excluded or a case where the terminal portion is included in maintaining the whole shape of the wiring body 120. More specifically, herein, the terminal portion of a wire-like transmission member 130 (the connector C in the example illustrated in FIG. 8) is provided on an outer side of the shape maintaining member 140. In such a case, the shape maintaining member 140 can maintain the whole shape of the wiring body 120 except for the terminal portion. Even in this case, if a dimension of the terminal portion extending from the shape maintaining member 140 is small, the shape of the terminal portion can be mostly maintained. In the meanwhile, there may also be a case where the terminal portion of the wire-like transmission member 130 is provided on the shape maintaining member 140. In such a case, the whole shape of the wiring body 120 including the terminal portion can be maintained.

When the shape maintaining members 140 are continuously provided along the longitudinal direction of the wiring body 120 to be able to maintain the whole shape of the wiring body 120 in this manner, stiffness of the whole wiring member 110 can be increased. This wiring member 110 is considered a small wiring member 110 which can be easily transported from a manufacturing plant to an assembly plant as it is without being folded, for example. At this time, the portion to which the suction pad P is applied is the region A illustrated by a dashed-two dotted line in FIG. 8, for example.

The wiring member 110 according to the second embodiment 2 is also different from the wiring member 10 according to the first embodiment in that a both-side covering part 14 is included.

The both-side covering part 14 is a part where the shape maintaining member 140 covers both sides of the wiring body 20 along a front-back direction thereof. In the description of the example illustrated in FIG. 8, the portion of the wiring member 110 where the shape maintaining member 140 is provided is made up of only the both-side covering part 14. The both-side covering part 14 is made up of the two shape maintaining members 140. In the description hereinafter, when the two shape maintaining members 140 need to be distinguished, the shape maintaining member 140 located on a side of the wire-like transmission member 130 is referred to as a shape maintaining member 140a and the shape maintaining member 140 located on the opposite side (a side of a sheet-like member 122) is referred to as a shape maintaining member 140b in some cases hereinafter.

In the both-side covering part 14, the two shape maintaining members 140 are fixed in a state of sandwiching the wiring body 120. At this time, in the example illustrated in FIG. 8, the shape maintaining members 140 are directly fixed to each other. Any of the fixing states of fixing the sheet-like member 122 to the fixing target described in the first embodiment can be applied as the fixing state of fixing the shape maintaining members 140, however, the contact area fixation is preferable, and the contact area direct fixation is more preferable.

In the example illustrated in FIG. 8, the sheet-like member 122 and one shape maintaining member 140 are not directly fixed to each other. A portion of the wiring body 120 where the sheet-like member 122 and the wire-like transmission member 130 are overlapped with each other is sandwiched between the two shape maintaining members 140 and fixed thereto. In the example illustrated in FIG. 8, in the sheet-like member 122 and the wire-like transmission member 130 in the wiring body 120, only the sheet-like member 122 is not formed to be sandwiched between the two shape maintaining members 140 and fixed thereto on a lateral side of the wire-like transmission member 130. Needless to say, in the sheet-like member 122 and the wire-like transmission member 130 in the wiring body 120, only the sheet-like member 122 may be formed to be sandwiched between the two shape maintaining members 140 and fixed thereto on a lateral side of the wire-like transmission member 130.

Needless to say, the sheet-like member 122 and one shape maintaining member 140 may be directly fixed to each other. In this case, the sheet-like member 122 and the shape maintaining member 140b may be directly fixed to each other on a back side of the wire-like transmission member 130, or the shape maintaining member 140a or the shape maintaining member 140b or both of them and the sheet-like member 122 may also be directly fixed to each other on a lateral side of the wire-like transmission member 130. At this time, it is also considered that the two shape maintaining members 140 are not directly fixed to each other, but each of the two shape maintaining members 140 is directly fixed to the sheet-like member 122.

Stiffness of the wiring member 110 can be further increased by providing the both-side covering part 14. Alternatively, it is sufficient that necessary stiffness can be obtained by the shape maintaining members 140 on the both sides, thus the shape maintaining members each having small stiffness can also be used.

Modification Example

Figure 10:
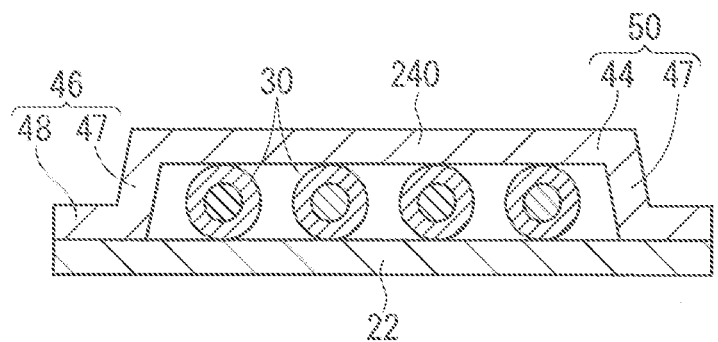
FIG. 10 is a cross-sectional view illustrating a modification example of a shape maintaining member.

FIG. 10 is a cross-sectional view illustrating a modification example of a shape maintaining member.

In the above description, the base material formed into the flat sheet-like shape is used as the shape maintaining members 40 and 140, however, this configuration is not necessary. There may also be a case where the shape maintaining members 40 and 140 are each three-dimensionally molded as the shape maintaining member.

A shape maintaining member 240 illustrated in FIG. 10 includes a planarly molded part 44 and a three-dimensionally molded part 46. Herein, a portion of the shape maintaining member 240 constituting the one-side covering part 12 is three-dimensionally molded.

The planarly molded part 44 is a part molded into a planar shape. For example, the planarly molded part 44 is a part covering the wire-like transmission member 30.

The three-dimensionally molded part 46 is a part molded to stand upright in a front-back direction of the planarly molded part 44 from a part of the planarly molded part 44 along a width direction thereof and extend in a longitudinal direction. Herein, a sidewall part 47 standing upright on each of both sides of the planarly molded part 44 and a flange part 48 extending to a lateral side from one end of the sidewall part 47 are formed as the three-dimensionally molded part 46. Thus, the shape maintaining member 240 is formed into a gutter-like shape having the flange part 48. The wire-like transmission member 30 is housed in a gutter portion surrounded by the planarly molded part 44 and the sidewall parts 47, and the flange part 48 is fixed to the sheet-like member 22.

Herein, one three-dimensionally molded part 46 is continuously formed in a longitudinal direction in one set of shape maintaining member 240. The three-dimensionally molded part 46 may be formed to have a different shape along the longitudinal direction in one set of shape maintaining member 240.

The shape maintaining member 240 is formed by three-dimensionally vacuum-molding the base material molded into the sheet-like shape, for example. The shape maintaining member 240 is also considered to be three-dimensionally molded originally by extrusion molding, for example.

The shape of the three-dimensionally molded part 46 is not limited thereto described above. For example, a rib may be provided on a side of an outer surface of the planarly molded part 44 as the three-dimensionally molded part 46. Only one rib or a plurality of ribs may be provided.

The shape maintaining member 240 which is three-dimensionally molded may be used as the shape maintaining member of a portion constituting the both side covering part 14. At this time, the shape maintaining member 240 which is three-dimensionally molded may be used for only the shape maintaining member covering a side of the wire-like transmission member 30 in the two shape maintaining members, or may also be used for both of the two shape maintaining members. When the shape maintaining member 240 which is three-dimensionally molded is used for both of the two shape maintaining members constituting the both side covering part 14, the two shape maintaining members may be molded into the same shape or different shapes.

Stiffness of the shape maintaining member 240 can be further increased by providing such a three-dimensionally molded part 46. Particularly, stiffness of the shape maintaining member 240 along the longitudinal direction can be further increased. At this time, when the shape maintaining member 240 is three-dimensionally molded so that a gutter portion 50 is formed to be able to house the wire-like transmission member 30, force on the wire-like transmission member 30 at a time when the shape maintaining member 240 sandwiches the wire-like transmission member 30 can be suppressed. The same applies to a case where the three-dimensionally molded part 46 is provided in the shape maintaining member 240 constituting the both side covering part 14.

In the examples illustrated in FIG. 2 and FIG. 9, end portions of the shape maintaining members 40 and 140 in a width direction are deformed to be bended to the intermediate portion. For example, when the sheet-like members 22 and 122 and the shape maintaining members 40 and 140 are fixed to each other, respectively, or the shape maintaining members 140 are fixed to each other on lateral sides of the wire-like transmission members 30 and 130, the shape maintaining members 40 and 140 are also considered to be deformed in this manner. At this time, when this deformation is a three-dimensional deformation having higher stiffness than a case where each of the shape maintaining members 40 and 140 remains the flat base material and also is a deformation in which the deformation state is maintained even when the fixing state is resolved, the shape maintaining members 40 and 140 deformed in such a manner can also be deemed as a type of the above shape maintaining member 240 including the planarly molded part 44 and the three-dimensionally molded part 46.

In addition, in the above description, the wiring member 10 having the easy-folding part 16 includes only the one-side covering part 12, however, this configuration is not necessary. Similarly, in the above description, the wiring member 10 which does not have the easy-folding part 16 includes only the both side covering part 14, however, this configuration is not necessary. For example, the both side covering part 14 may be applied to the wiring member 10 having the easy-folding part 16, or the one-side covering part 12 may also be applied to the wiring member 110 which does not have the easy-folding part 16. In a case where the both side covering part 14 is applied to the wiring member 10 having the easy-folding part 16, when there is the both side covering part 14 in a terminal side portion, the shape maintaining member is also exposed to an outer surface of the terminal side portion in a folded state. Accordingly, the suction pad P is applied to this portion to be able to develop the terminal side portion.

In the above description, one wiring member 10 has only the one-side covering part 12 or only the both side covering part 14, however, this configuration is not necessary. One wiring member 10 may have both the one-side covering part 12 and the both side covering part 14. In this case, the one-side covering part 12 and the both side covering part 14 are considered to be located in different positions along the longitudinal direction of the wiring body 20.

It is sufficient that the shape maintaining member 40 covers at least a part of a surface of at least one of a front surface and a back surface of the wiring body 20 to maintain the shape of the wiring body 20. In the wiring body 20, a side on which the wire-like transmission member 30 is located on the sheet-like member 22 is defined as the front surface and an opposite side is defined as the back surface. The one-side covering part 12 described above is a part where the shape maintaining member 40 covers only the front surface of the wiring body 20. The both side covering part 14 described above is a part where the shape maintaining member 40 covers both the front surface and the back surface of the wiring body 20. When the shape maintaining member 40 covers only the one surface of the wiring body 20, the shape maintaining member 40 may cover only the back surface, in the front surface and the back surface, of the wiring body 20. When the shape maintaining member 40 covers only the back surface of the wiring body 20, the shape maintaining member 40 may be wholly fixed to the back surface of the sheet-like member 22, or only a part thereof such as both lateral sides may be fixed thereto. The shape maintaining member 40 covering the front surface of the wiring body 20 and the shape maintaining member 40 covering the back surface thereof may be provided in different regions along the longitudinal direction of the wire-like transmission member 30.

In the above description, the wire-like transmission member 30 and the shape maintaining members 40, 140, and 240 are not directly fixed to each other, however, this configuration is not necessary. The wire-like transmission member 30 and the shape maintaining members 40, 140, and 240 may be directly fixed to each other. The fixing state in this case is not particularly limited, however, any of the fixing states of fixing the sheet-like member 22 to the fixing target described in the first embodiment, for example, is considered to be applied. The wire-like transmission member 30 and the shape maintaining member 40 are considered to be fixed to each other by the contact area direct fixation, for example.

The configurations described in the embodiments and modification examples thereof can be appropriately combined as long as they are not contradictory.

Although the present disclosure is described above in detail, the foregoing description is in all aspects illustrative and does not restrict the invention. It is therefore understood that numerous modifications can be devised without departing from the scope of the invention.

EXPLANATION OF REFERENCE SIGNS 10 wiring member
12 one-side covering part
14 both-side covering part
16 easy-folding part
17 first easy-folding part
18 second easy-folding part
20 wiring body
22 sheet-like member
30 wire-like transmission member
32 transmission wire body
34 covering
40 shape maintaining member
42 wavelike processed part
43a peak
43b trough
44 planarly molded part
46 three-dimensionally molded part

The invention claimed is:

1. A wiring member, comprising:
a wiring body including a sheet-like member and a wire-like transmission member fixed on the sheet-like member; and
a shape maintaining member formed into a sheet-like shape having higher stiffness than the sheet-like member of the wiring body and covering at least one of a front side or a back side of the wiring body to maintain a shape of the wiring body, wherein
the wiring member includes a both-side covering part where the shape maintaining member includes a front portion and a back portion respectively covering the front side and the back side of the wiring body, such that the sheet-like member and the wire-like transmission member of the wiring body are sandwiched between the front portion and the back portion of the shape maintaining member,
the shape maintaining member includes a first sheet and a second sheet, and
the first sheet is spaced from the second sheet in a longitudinal direction of the wire-like transmission member so that the wiring member is foldable between the first sheet and the second sheet.

2. The wiring member according to claim 1, further comprising
a one-side covering part where the shape maintaining member covers the wire-like transmission member only from a side opposite to the sheet-like member of the wiring body.

3. The wiring member according to claim 2, wherein
the shape maintaining member and the sheet-like member are fixed by a contact area direct fixation on a lateral side of the wire-like transmission member in the one-side covering part.

4. The wiring member according to claim 1, wherein
the shape maintaining member is provided continuously along a longitudinal direction of the wiring body to be able to maintain a whole shape of the wiring body.

5. The wiring member according to claim 1, wherein
the shape maintaining member is provided so that the wiring member can be folded at an intermediate portion.

6. The wiring member according to claim 5, wherein
the wiring member is provided so that a suction pad is able to be applied to a position where the shape maintaining member is exposed when the wiring member is folded at the intermediate portion.

7. The wiring member according to claim 1, wherein
the sheet-like member and the shape maintaining member are fixed to each other via an adhesive agent or resin.

8. The wiring member according to claim 1, wherein
the sheet-like member and the shape maintaining member are fixed to each other by a contact area direct fixation.

9. The wiring member according to claim 1, wherein
the shape maintaining member includes a wavelike processed part including alternating peaks and troughs arranged at a cross-section in the longitudinal direction of the wire-like transmission member so that the wiring member is foldable at the wavelike processed part.

10. The wiring member according to claim 1, wherein
the sheet-like member includes a plurality of sheets of base materials connected along the longitudinal direction of the wire-like transmission member.

11. A wiring member, comprising:
a wiring body including a sheet-like member and a wire-like transmission member fixed on the sheet-like member; and
a shape maintaining member formed into a sheet-like shape having higher stiffness than the sheet-like member of the wiring body and covering at least a part of at least one of a front surface and a back surface of the wiring body to maintain a shape of the wiring body, wherein the wiring member includes a both-side covering part where the shape maintaining member includes a front portion and a back portion respectively covering the front surface and the back surface of the wiring body, such that the sheet-like member and the wire-like transmission member of the wiring body are sandwiched between the front portion and the back portion of the shape maintaining member, the shape maintaining member includes a first sheet and a second sheet, and the first sheet is spaced from the second sheet in a longitudinal direction of the wire-like transmission member so that the wiring member is foldable between the first sheet and the second sheet.

12. The wiring member according to claim 1, wherein the sheet-like member is made up of a plurality of base materials connected along the longitudinal direction of the wire-like transmission member.

\* \* \* \* \*